United States Patent [19]
Hill

[11] Patent Number: 6,082,808
[45] Date of Patent: Jul. 4, 2000

[54] PRIVACY SCREEN FOR A VEHICLE

[76] Inventor: Bruce Wayne Hill, 26745 Dartmouth, Inkster, Mich. 48141

[21] Appl. No.: 09/146,830

[22] Filed: Sep. 4, 1998

[51] Int. Cl.[7] .................................. B60J 7/00; B60J 3/00
[52] U.S. Cl. ............................................ 296/140; 296/97.6
[58] Field of Search ................................... 296/97.6, 97.7, 296/97.8, 140; 160/370.21, DIG. 3

[56] References Cited

U.S. PATENT DOCUMENTS

| | | |
|---|---|---|
| 3,454,300 | 7/1969 | Pugsley et al. . |
| 4,647,102 | 3/1987 | Ebrahimzadeh . |
| 5,078,194 | 1/1992 | Phillips . |
| 5,165,748 | 11/1992 | O'Connor ............................ 296/97.6 |
| 5,211,442 | 5/1993 | Shikano . |
| 5,344,206 | 9/1994 | Middleton . |
| 5,409,286 | 4/1995 | Huang ..................................... 296/136 |
| 5,575,524 | 11/1996 | Cronk . |

FOREIGN PATENT DOCUMENTS

| | | | |
|---|---|---|---|
| 002688743 | 9/1993 | France | ................................. 296/97.6 |
| 406055935 | 3/1994 | Japan | ................................... 296/97.6 |

*Primary Examiner*—B. Dayoan
*Assistant Examiner*—Greg Blankenship
*Attorney, Agent, or Firm*—Kenneth L. Tolar

[57] ABSTRACT

A vehicle privacy screen includes a fabric curtain member having top, bottom and two opposing side edges. Integral with the top edge and extending from the two opposing side edges of the curtain member is a continuous, length adjustable strap for securing the curtain member to an existing vehicle sun visor. Adjacent each side edge of the curtain member are one or more hook and loop fasteners for joining a first curtain member to an adjacent curtain member.

4 Claims, 2 Drawing Sheets

PRIVACY SCREEN FOR A VEHICLE

BACKGROUND OF THE INVENTION

The present invention relates to a privacy screen specifically designed for the front windshield of a vehicle.

DESCRIPTION OF THE PRIOR ART

Most conventional shades and privacy screens for vehicles are designed for the vehicle's side or rear windows. Accordingly, when camping or otherwise sitting within a parked car for extended periods of time, complete privacy is not possible since the front windshield is uncovered. Although various shades for windshields exist, most relate to window shade type assemblies or rigid panels which are unattractive.

The present invention provides a uniquely configured curtain assembly designed to provide a privacy screen adjacent the front windshield. Accordingly, a user may enjoy complete privacy when camping or sitting within a parked vehicle. Furthermore, the curtain assembly is quickly attachable to the vehicle sun visor eliminating the need for complicated mounting brackets or support rods.

Although various sun visors, shades and vehicle curtains exist in the prior art, none have the unique features and advantages according to the present invention. For example, U.S. Pat. No. 5,211,442 issued to Shikano relates to a curtain installation structure comprising a garnish installed to cover a pillar of a vehicle. The garnish defines a curtain receiving section at a side end portion of a window. A cover member is hingedly connected to the garnish to close the curtain receiving section.

U.S. Pat. No. 5,078,194 issued to Phillips relates to an automatic retractable shade mounting case. The case is designed to allow the shade unit to be mounted on both curved, solid surfaces and on straight, non-curved surfaces.

U.S. Pat. No. 4,647,102 issued to Ebrahimzadeh relates to a windshield curtain comprising an opaque, vertically pleated panel having a rigid rod with suction cups thereon to secure the assembly to a windshield.

U.S. Pat. No. 5,575,524 issued to Cronk relates to a discreet motor vehicle shade. The device includes a scroll type shade received within a cover secured to the window frame.

U.S. Pat. No. 5,344,206 issued to Middleton relates to an automobile shade including a rectangular frame secured to the interior windshield of a vehicle with a sheet of material received therein. The sheet is deployed and retracted with an electric power source.

U.S. Pat. No. 3,454,300 issued to Pugsley et al relates to a retractable window cover secured to a reel disposed on one side of the windshield.

Although windshield shades and covers exist in the prior art, most relate to window shade type covers which are unsightly. Furthermore, the devices are attachable either directly to the windshield or to the windshield frame. The present invention overcomes these problems by providing a decorative curtain assembly which may be conveniently attached to a vehicle windshield visor. Furthermore, the curtains may be easily stored in an inconspicuous location when not in use.

SUMMARY OF THE INVENTION

The present invention relates to a curtain assembly for a vehicle. The device comprises a curtain member having a top edge and two opposing side edges. Integral with the curtain, adjacent its top edge, is a strap that extends from the opposing side edges for encompassing an existing vehicle sun visor to secure the curtain within the vehicle. Along each side edge of the curtain are hook and loop fasteners or a similar attachment means for joining a first curtain to a second, adjacent curtain. A pouch is attached to the top edge of the curtain for storing the curtain when not in use. It is therefore an object of the present invention to provide a curtain assembly for a vehicle that provides a privacy shield adjacent the vehicle's windshield.

It is yet another object of the present invention to provide a curtain assembly which may be easily installed.

It is yet another object of the present invention to provide a curtain assembly for a vehicle which may be conveniently stored when not in use. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
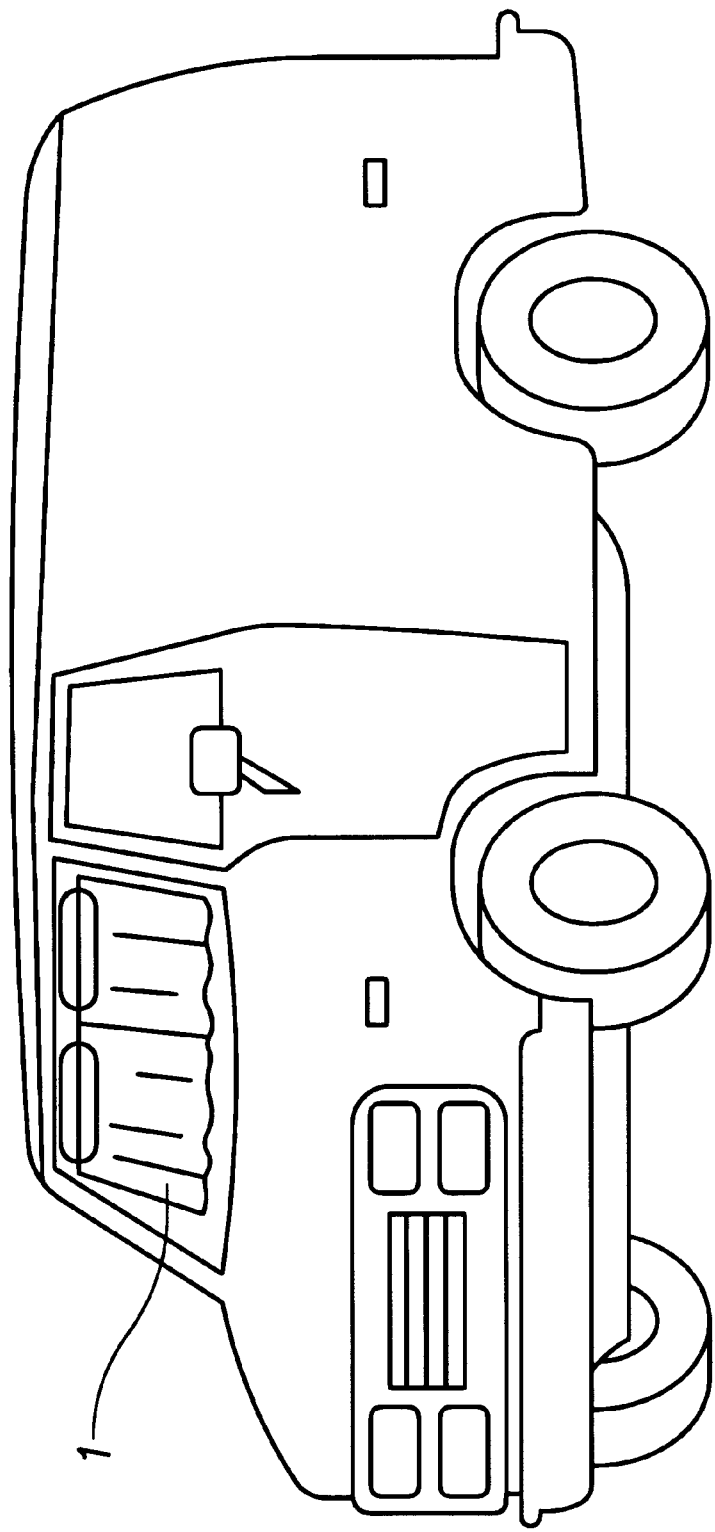
FIG. 1 depicts the curtain assembly according to the present invention installed within a vehicle.
Figure 2:
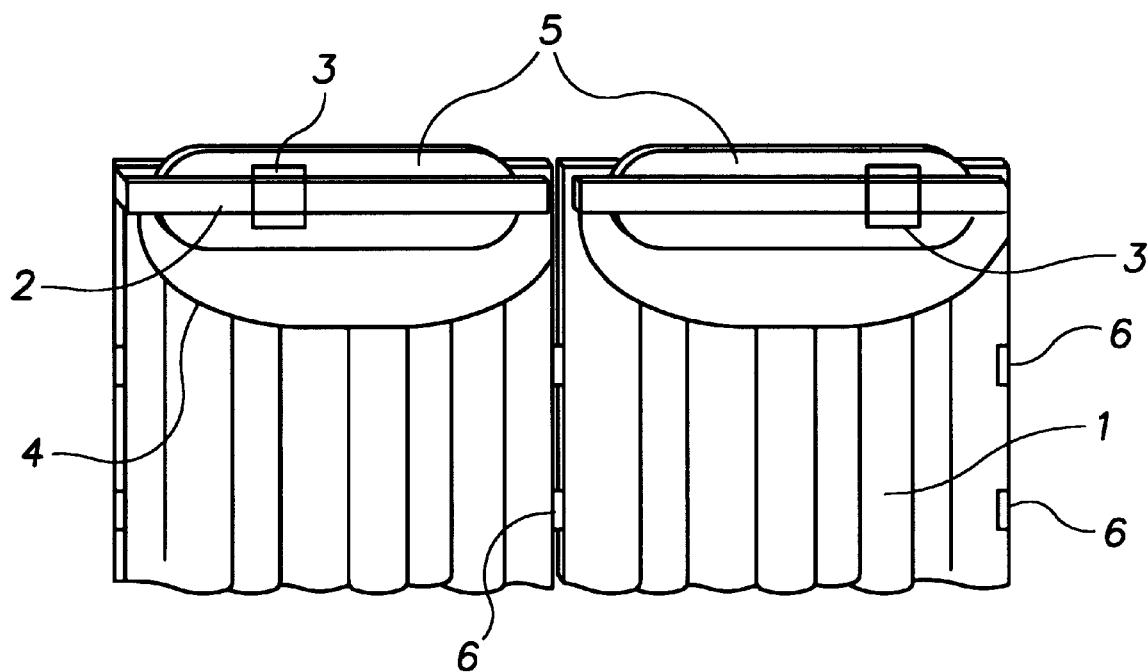
FIG. 2 depicts a front view of a pair of curtain members according to the present invention installed on a visor.
Figure 3:
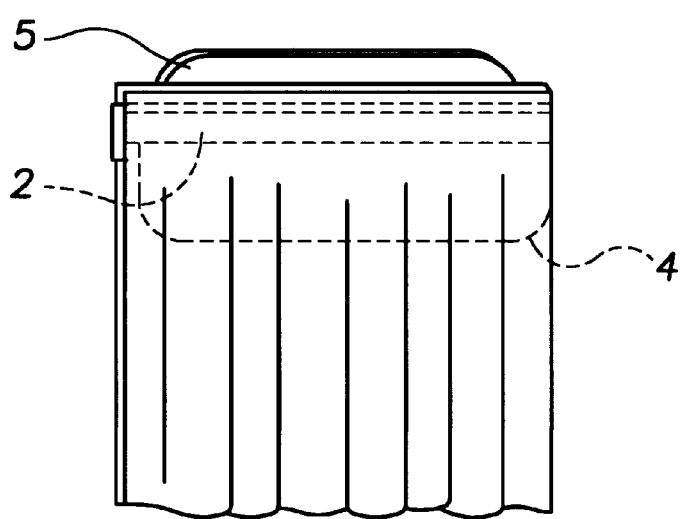
FIG. 3 is a rear view of the inventive device installed on a visor.

Referring now to FIGS. 1 through 3, the present invention relates to a curtain assembly for a vehicle. The device comprises a curtain member 1 having a top edge, a bottom edge and two opposing side edges. The curtain member preferably has a sinuous cross-sectional configuration similar to that of a conventional curtain. Integral with the top edge of the curtain Integral with the top edge of the curtain and extending from each side edge is an elastomeric strap 2 for encompassing a conventional, front-mounted vehicle sun visor 5 to secure the curtain within the vehicle. One or more adjustment buckles 3 are mounted on the strap for adjusting the length thereof to secure the strap about various sized visors. The adjustment buckles are conventional and are found on items such as brassieres for adjusting the length of the shoulder strap.

Downwardly depending from the top edge of the curtain member is an envelope type pouch 4 for storing the curtain when not in use. The pouch preferably includes a horizontal slit near its top end into which the curtain may be placed. Accordingly, when not in use, the curtain may be folded and conveniently stored in an inconspicuous, unobtrusive position without removing the curtain from the sun visor.

Adjacent each side edge of the curtain member are one or more hook and loop fasteners 6 for joining a first curtain member to an adjacent curtain member as depicted in FIG. 2. Accordingly, a pair of curtain members may each be attached to a select visor and joined to form a complete privacy screen that covers substantially the entire front windshield.

The curtain according to the present invention is preferably constructed with a fabric material while the strap is constructed with elastic. However, as will be readily apparent to those skilled in the art, the size, shape and materials of construction of the various components may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A privacy screen for a vehicle comprising:

a curtain member having a top edge, a bottom edge and two opposing side edges;

a continuous elongated elastomeric strap, a portion of which is encased within the top edge of said curtain member with a remaining portion extending from opposing side edges thereof for encompassing said vehicle sun visor.

2. A privacy screen according to claim 1 wherein said strap further includes an adjustment means for selectively adjusting the length thereof.

3. A privacy screen according to claim 2 wherein said curtain member further includes a hook and loop fastener adjacent each side edge for removably joining said curtain member to another adjacent curtain member.

4. A privacy screen according to claim 3 wherein the privacy screen further comprises a pouch downwardly depending from the top edge of said curtain member for inconspicuously storing said curtain member when not in use.

* * * * *